United States Patent [19]

Kassai

[11] Patent Number: 4,587,864

[45] Date of Patent: May 13, 1986

[54] HANDLE HEIGHT ADJUSTING MECHANISM FOR A BABY CARRIAGE

[75] Inventor: Kenzou Kassai, Osaka, Japan

[73] Assignee: Aprica Kassai Kabushikikaisha, Osaka, Japan

[21] Appl. No.: 659,667

[22] Filed: Oct. 11, 1984

[30] Foreign Application Priority Data

Nov. 4, 1983 [JP] Japan .......................... 58-171761[U]

[51] Int. Cl.⁴ ........................ B62K 21/16; F16B 7/10; B62B 7/12
[52] U.S. Cl. ............................. 74/551.3; 280/47.37 R; 403/379; 403/109
[58] Field of Search .................... 74/551.3, 525, 551.7; 403/330, 316, 108, 109, 379; 280/47.37 R; 5/101–109

[56] References Cited

U.S. PATENT DOCUMENTS 2,699,162 1/1955 Nazzaro .......................... 403/379 X
3,353,852 11/1967 Wood .............................. 403/379 X
3,669,463 6/1972 Boudreau ..................... 280/47.37 R
3,771,885 11/1973 Brown ................................ 403/379

Primary Examiner—Kenneth J. Dorner
Assistant Examiner—Vinh Luong
Attorney, Agent, or Firm—W. G. Fasse; Jr. Kane

[57] ABSTRACT

A mechanism for adjusting the height of the handle (11) of a baby carriage wherein the handle (11) has upper rod portions ending in a grip, and lower rod portions for substantially vertically and slidably supporting the respective upper rod portion. Each lower rod portion has a vertically extending throughgoing elongated opening and a pin passing through the elongated opening in the lower rod portion. The opposite ends of the pin project out of the upper rod portion. One end of the pin (26) has a knob (26) fixed thereto which is positioned in contact with the outer surface of the upper rod portion. The other end of the pin has an external thread which is adapted to engage with an internal thread positioned on the outer surface of the upper rod portion. The upper rod portion has elongated holes or at least one such which hole which is so located that pressing the upper or outer rod portion against the lower or inner rod portion is facilitated when the thraded pin is tightened.

1 Claim, 3 Drawing Figures

HANDLE HEIGHT ADJUSTING MECHANISM FOR A BABY CARRIAGE

BACKGROUND OF THE INVENTION

1. Field of the Invention

This invention relates to a mechanism for adjusting the height of the handle of a baby carriage.

2. Description of the Prior Art

Baby carriages are provided with a handle for the user to push a carriage by hand. Generally, this handle is fixed to the carriage body and its height cannot be adjusted. As a result, there have been various inconveniences. That is, some of the persons who push a baby carriage are tall and others are short. For these persons it is inconvenient that the height of the handle cannot be changed.

SUMMARY OF THE INVENTION

Accordingly, an object of this invention is to provide a mechanism enabling the height of the handle of a baby carriage to be adjusted with ease.

According to this invention, the handle comprises an upper rod portion having a grip, and a lower rod portion for vertically slidably supporting said upper rod portion. Either of the upper and lower rod portions forms a sleeve and the other forms an insert adapted to be received in the opening in the sleeve. The insert has a vertically extending elongated opening. The sleeve is provided with a pin which passes through the sleeve and through the elongated opening in the insert. The opposite ends of the pin project outside the sleeve. One end of the pin has a knob fixed thereto which is positioned in contact with the outer surface of the sleeve, while the other end of the pin has an external thread. The external thread engages an internal thread positioned on the outer surface of the sleeve. Further, the sleeve is provided with two elongated holes which are located substantially opposite each other in two opposite wall portions of the sleeve for helping to deflect the sleeve.

As described above, according to this invention, the handle to be pushed by hand comprises a sleeve, and an insert received in an opening in said sleeve whereby the insert is slidable relative to said sleeve. Further, the two elongated holes in opposite wall portions of the sleeve permit the sleeve to deflect with ease to thereby produce a large amount of friction between the sleeve and the insert; thus, turning the knob makes it possible to inhibit a relative sliding movement between the sleeve and the insert. Therefore, the height of the handle can be suitably adjusted according to the stature of the person pushing the baby carriage.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
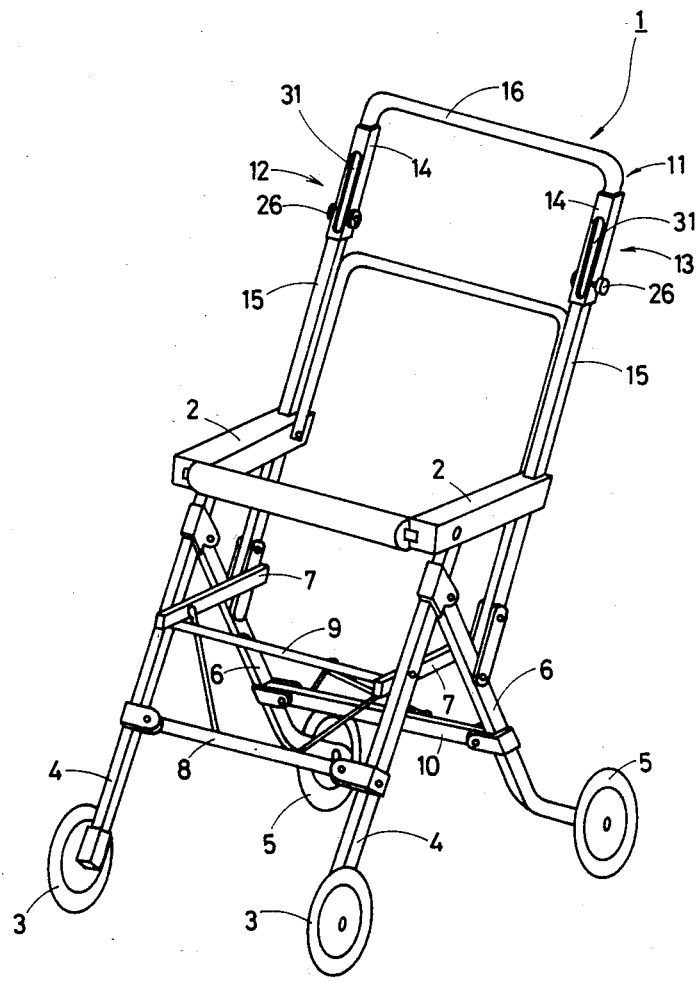
FIG. 1 is a perspective view of a baby carriage equipped with an embodiment of this invention.

Referring to FIG. 1, a baby carriage 1 comprises handrails 2, front legs 4 each having a front wheel 3, rear legs 6 each having a rear wheel 5, seat support rods 7 for supporting a seat, connecting members 8, 9, and 10 for interconnecting right and left members, and a push rod, i.e., handle 11 connected at its lower end to the rear legs 6. The handle 11 is used for moving the baby carriage 1. This invention relates to a mechanism for adjusting the height of this handle.

The push rod 11, in this embodiment, is an inverted U-shape mechanisms 12 and 13 for adjusting the height of the handle are installed on the right-hand and left-hand sides. The mechanism 12 on the right-hand side is the same in its basic arrangement and also in its operation as the mechanism 13 on the left-hand side. Thus, the following description refers only to the right-hand side mechanism 12.

Figure 2:
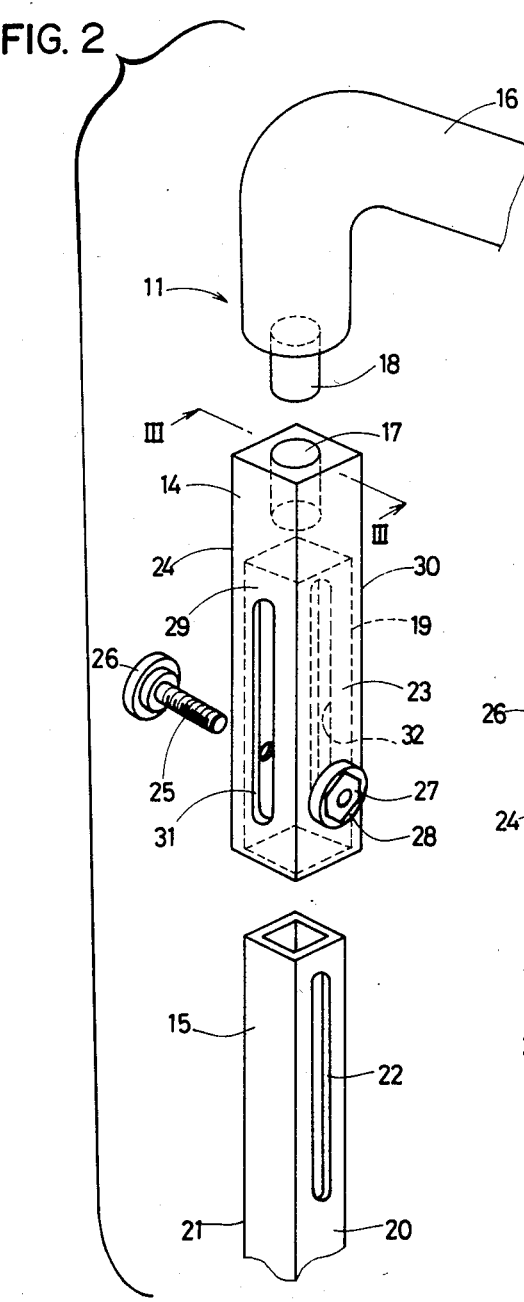
FIG. 2 is a perspective view showing the principal portions of this invention in disassembled condition.

Referring to FIGS. 1 and 2, the handle 11 comprises upper rod portions 14, and lower rod portions 15. The upper rod portions 14 have a grip 16 to be gripped by the person who pushes the baby carriage. The upper rod portions 14 and the grip 16 may be fixed together. Alternatively, they may be constructed as follows: The upper end of each upper rod portion 14 is formed with a circular opening 17, while the lower end of the grip 16 is formed with a circular projection 18. Thus, by engaging the opening 17 and the projection 18 with each other, the grip 16 can be attached to the upper rod portion 14. In addition, if the grip 16 is collapsible, the same arrangement may be supplemented with a structure which allows the projection 18 to turn inside the opening 17.

The lower rod portion 15 supports the upper rod portion 14 for a vertical sliding movement. More particularly, the upper rod portion 14 forms a sleeve internally having an opening 19, while the lower rod portion 15 forms an insert adapted to be slidably received in said opening 19 from one end of the upper rod portion 14. In addition, the upper and lower rod portions 14 and 15 are quadrangular in cross-section, in for example this embodiment.

Figure 3:
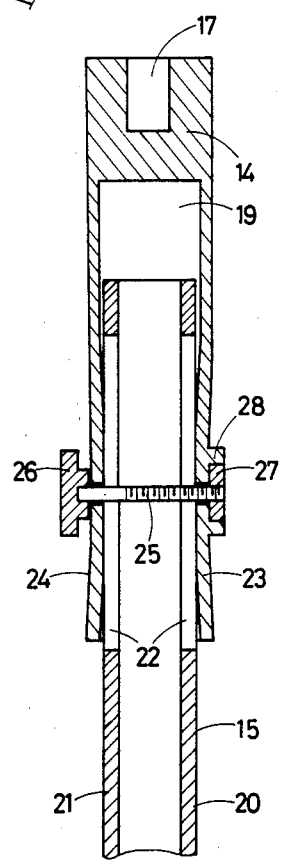
FIG. 3 is a sectional view taken along the line III—III of FIG. 2.

As shown in FIG. 2, the lower rod portion or insert 15 has a vertically extending elongated opening 22 which passes from the left-hand side surface 20 to the right-hand surface 21. The upper rod portion 14 is provided with a pin 25 which, when the lower rod portion 15 is inside the opening 19 in the upper rod portion 14, extends through the elongated opening 22 in the lower rod portion 14. The opposite ends of the pin 25 project beyond the left-hand and right-hand side surfaces 23 and 24. This state is seen in FIG. 3. As shown, one end of the pin 25 has a knob 26 fixed thereto which is positioned in contact with the right-hand side surface 24 of the upper rod portion 14. The other end of the pin 25 is formed with an external thread adapted to engage with the internal thread of a nut 27 positioned on the left-hand side surface 23 of the upper rod portion 14. Preferably, the left-hand side surface 23 of the upper rod portion 14 is formed with a nut receiving projection 28 for receiving the nut 27 and inhibiting rotation of the nut 27.

Further, the front and back surfaces 29 and 30 of the upper rod portion 14 are provided with vertically extending, elongated holes 31 and 32, respectively. These holes 31 and 32 are positioned so that a plane passing centrally and vertically through both holes 31, 32 extends perpendicularly through the longitudinal axis of the pin 25 and thus perpendicularly to a further plane passing centrally and vertically through the opening 22. Further, the holes 31 and 32 are so positioned that their upper ends are located above the pin 25 and their lower ends are located below the pin 25, whereby the deflection of the side walls 23 and 24 of the upper rod portion or sleeve 14 is facilitated when the pin 25 is tightened.

The operation will now be described.

Since the pin 25 with the knob 26 fixed at one end thereof is engaged with the nut 27, turning the knob 26 in a predetermined direction causes the upper rod portion 14 to deflect inwardly due to the holes 31, 32, with the result that the right-hand and left-hand side walls 24 and 23 of the upper rod portion 14 move toward each other as best seen in FIG. 3. In this case, since the holes 31 and 32 are formed in the front and back walls 29 and 30 of the upper rod portion 14, the upper rod portion 14 can be deflected easily even with a small force and the amount and extent of deflection can be increased. Further, since the upper rod portion 14 can be deflected without much effort, damage to the upper rod portion 14 can be minimized. Thus, when the knob 26 is turned by a predetermined amount in a predetermined direction, the right-hand and left-hand side walls 24 and 23 of the upper rod portion 14 are deflected, with the result that the right-hand and left-hand side surfaces 21 and 20 of the lower and portion 15 positioned in the interior are pressed. Therefore, a substantial friction is produced between the right-hand side wall 24 of the upper rod portion 14 and the right-hand side wall 21 of the lower rod portion 15, and between the left-hand side wall 23 of the upper rod portion 14 and the left-hand side wall 20 of the lower rod portion 15, thereby inhibiting a sliding movement of the upper rod portion 14.

In addition, to ensure easier deflection of the upper rod portion 14, it is preferable that the upper rod portion 14 be made of a flexible material such as plastics.

When it is desired to change the height of the handle, first the knob 26 is turned in a predetermined direction to widen the distance between the right-hand and left-hand side walls 24 and 23 of the upper rod portion 14. Thereupon, the deflection of the right-hand and left-hand side walls 24 and 23 disappears and so does the friction between the right-hand side wall 24 of the upper rod portion 14 and the right-hand side wall 21 of the lower rod portion 15 and between the left-hand side wall 23 of the upper rod portion 14 and the left-hand side wall 20 of the lower rod portion 15; thus, the upper rod portion 14 is allowed to slide with ease on the lower rod portion 15 within the range allowed by the pin 25 moving in the elongated opening 22. Then, the upper rod portion 14 is moved to a suitable position, whereupon the knob 26 is turned in a predetermined direction to inhibit the slide movement. In this way the height of the handle can be easily adjusted to any desired position within the adjustment range.

The handle height adjusting mechanism described with reference to FIGS. 1 to 3 is an embodiment of this invention shown by way of example. Therefore, various changes or modifications are possible. A typical modification will now be described.

First, attention is given to the elongated holes 31 and 32. In the illustrated embodiment, these holes have been formed in the front and back surfaces 29 and 30 of the upper rod portion 14. However, considering that the purpose of these holes is to allow the upper rod portion 14 to deflect with ease, only either the front surface 29 or the back surface 30 may be formed with such an elongated hole. Alternatively, a plurality of elongated holes may be formed in the front surface 29 or in the back surface 30 or both. Further, in the illustrated embodiment, the elongated holes have been shown extending vertically in parallel with the direction of the length of the upper rod portion 14, but they may extend obliquely. In short, so long as they are elongated holes crossing the outer peripheral line of the cross-section passing through the opposite ends of the pin 25 having the knob 26 at one end thereof, their number, the way they extend or their position may be as described.

In the illustrated embodiment, both, the upper and lower rod portions 14 and 15 have been quadrangular in cross-section. However, they may have a circular cross-section. In this case also, there is no possibility of the upper rod portion 14 rotating on the lower rod portion 15 because such rotation is inhibited by the fact that the pin 25 attached to the upper rod portion 14 engages with the elongated opening 22 formed in the lower rod portion 15.

In the embodiment described above, the upper rod portion 14 forms a sleeve, while the lower rod portion 15 forms an insert adapted to be received in the opening in the sleeve. However, this arrangement may be reversed. That is, the lower rod portion 15 may form a sleeve and the upper rod portion 14 may form an insert.

Further, a baby carriage has been shown as an example to which the invention is applied. However, the type of the baby carriage is not limited to the illustrated type and may be any other one. For example, it may be a baby carriage of the type in which the grip 16 is made collapsible, as described previously. Further, examples of handcarts are not limited to baby carriages and include shopping carts and load carrying vehicles.

Although the present invention has been described and illustrated in detail, it is clearly understood that the same is by way of illustration and example only and is not to be taken by way of limitation, the scope of the present invention being limited only by the terms of the appended claims.

What is claimed is:

1. A mechanism for adjusting the height of a handle, especially in a baby carriage, comprising handle means including an upper rod portion (14) having a grip (16), and a lower rod portion (15) slidably supporting said upper rod portion (14); either said upper rod portion (14) or said lower rod portion (15) forming a sleeve defining an opening, while the other rod portion forms an insert adapted to be received in said opening in said sleeve; said insert comprising a vertically extending throughgoing elongated opening (22); pin means (25) extending through said elongated opening (22) in said insert, said pin means having opposite pin ends projecting out of said sleeve; one pin end of said pin means (25) having a knob (26) fixed to said one pin end, said knob being positioned in contact with an outer surface of said sleeve, while the other pin end comprises an external threading which is adapted to engage with an internal thread positioned on an outer surface of said sleeve; and elongated hole means (31, 32) extending substantially longitudinally in said sleeve in such a position that flexing of said sleeve in response to tightening of said pin means is facilitated for locking said rod portions relative to each other.

* * * * *